(12) United States Patent
Finer et al.

(10) Patent No.: US 10,047,320 B2
(45) Date of Patent: Aug. 14, 2018

(54) METHOD FOR RECOVERING CRUDE TALL OIL

(71) Applicant: Stora Enso OYJ, Helsinki (FI)

(72) Inventors: Tiia Finer, Imatra (FI); Olli Timonen, Lappeenranta (FI)

(73) Assignee: Stora Enso OYJ, Helsinki (FI)

( * ) Notice: Subject to any disclaimer, the term of this patent is extended or adjusted under 35 U.S.C. 154(b) by 0 days.

(21) Appl. No.: 15/315,906

(22) PCT Filed: Jun. 2, 2015

(86) PCT No.: PCT/IB2015/054170
§ 371 (c)(1),
(2) Date: Dec. 2, 2016

(87) PCT Pub. No.: WO2015/186060
PCT Pub. Date: Dec. 10, 2015

(65) Prior Publication Data
US 2017/0088794 A1 Mar. 30, 2017

(30) Foreign Application Priority Data
Jun. 5, 2014 (SE) ...................................... 1450683

(51) Int. Cl.
*C11B 13/00* (2006.01)
*C11B 3/04* (2006.01)
(Continued)

(52) U.S. Cl.
CPC ............ *C11B 13/005* (2013.01); *C11B 3/006* (2013.01); *C11B 3/04* (2013.01); *C11B 13/02* (2013.01); *Y02W 30/74* (2015.05)

(58) Field of Classification Search
None
See application file for complete search history.

(56) References Cited

U.S. PATENT DOCUMENTS 3,014,879 A 12/1961 Palmqvist
3,404,063 A * 10/1968 Harding ............. D21C 11/0042
159/16.1
(Continued)

FOREIGN PATENT DOCUMENTS

CL 2013000413 8/2013
CL 2014003077 7/2015
(Continued)

OTHER PUBLICATIONS

International Search Report for PCT/IB2015/054170, dated Sep. 23, 2015.
(Continued)

*Primary Examiner* — Yate' K Cutliff
(74) *Attorney, Agent, or Firm* — Greer, Burns & Crain, Ltd.

(57) ABSTRACT

The present invention relates to a method for recovering crude tall oil from a soap which method comprises the steps of: determining a correlation between the crude tall oil content and the water content of the soap, determining an amount of acid and water needed in order to separate an optimal amount of crude tall oil from the soap dependent on the crude tall oil content of the soap, measuring the water content of the soap, adding the optimal amount of acid and water to the soap, mixing the added acid and water with the soap whereby an acidulated soap is formed and the crude tall oil is separated and recovering the separated crude tall oil from the acidulated soap.

11 Claims, 5 Drawing Sheets

(51) Int. Cl.
    *C11B 13/02*     (2006.01)
    *C11B 3/00*     (2006.01)

(56) References Cited

U.S. PATENT DOCUMENTS

| | | |
|---|---|---|
| 3,575,952 A | 4/1971 | Morris et al. |
| 5,283,319 A | 2/1994 | Huibers et al. |
| 5,898,065 A * | 4/1999 | Aitta ................ C11B 13/02 530/205 |

FOREIGN PATENT DOCUMENTS

| | | |
|---|---|---|
| EP | 1870445 A1 | 12/2007 |
| WO | 9323132 | 11/1993 |
| WO | 9634932 | 11/1996 |
| WO | 2013173077 A2 | 11/2013 |

OTHER PUBLICATIONS

European Search Report for Corresponding European Patent Application, dated Dec. 21, 2017.
Chilean Search Report for corresponding Chilean patent application, dated Nov. 24, 2017.
V.C. Uloth, Use of the Sodium Sesquisulphate By-Product of Chlorine Dioxide Generation for Tall Oil Soap Acidulation, Journal of Pulp and Paper Science: vol. 17, No. 6, Nov. 1991.

* cited by examiner

METHOD FOR RECOVERING CRUDE TALL OIL

This application is a U.S. National Stage under 35 U.S.C. § 371 of International Application No. PCT/IB2015/054170, filed Jun. 2, 2015, which claims priority to Swedish application No. 1450683-6 filed Jun. 5, 2014.

FIELD OF THE INVENTION

This invention relates to a method for recovering crude tall oil from a soap.

BACKGROUND

During production of kraft pulp, black liquor is formed and removed from the produced pulp. The removed black liquor comprises soap which needs to be separated from the black liquor since the soap comprises valuable raw materials. Another reason to separate the soap from the black liquor is that the soap may cause problems during subsequent treatment steps of the black liquor.

The separated soap comprises crude tall oil (CTO), water, lignin, inorganic compounds and fibers. The CTO is a mixture of fatty and resin acids and unsaponifiables. The fatty and resin acids of CTO are in the form of sodium salts in the soap. The amount of each component in the soap depends on the raw material used during the pulping process and on the recovery process in which the soap is separated from the black liquor, i.e. the soap skimming process.

Crude tall oil is a valuable raw material and it is important to recover as much of the crude tall oil from the soap as possible. Crude tall oil can be used as a raw material for various chemicals and other products, e.g. biodiesel or detergents.

It is possible to separate the CTO from the soap by addition of an acid to the soap at certain temperature. After mixing of the soap and the added acid an acidulated soap is formed and the acidulated soap separates then into three major phases due to density differences of the phases; a CTO phase, a lignin phase and a spent acid phase. The lignin and spent acid phase are rejects in the CTO production and they need to be separated well from the CTO phase during the recovery of the CTO.

The amount of acid needed in order to separate the optimal amount of CTO from the soap depends on the quality of the soap, e.g. the CTO content, the water content, the fiber amount, the lignin content and/or the black liquor content. Today it is common to measure the density of the soap, and the pH and density of the spent acid as a measure of the amount of acid and water that needs to be added in order to separate the optimal amount of the CTO from the soap. These measurements are done online and the needed amount of acid and water is thereafter adjusted, i.e. feed back control.

The methods used today are not very sensitive and fast enough to adjust the needed amount of acid and water when the quality of the soap changes. There is thus a need for an improved method for the control of the recovery of CTO from a soap.

SUMMARY OF THE INVENTION

It is an object of the present invention is to provide an improved method for recovering crude tall oil from a soap.

This object and other advantages are achieved by the method according to claim 1.

The present invention relates to a method for recovering crude tall oil from a soap wherein the method comprises the steps of:

(a) determining a correlation between the crude tall oil content and the water content of the soap, (b) determining an amount of acid and water needed in order to separate an optimal amount of crude tall oil from the soap depending on the crude tall oil content of the soap, (c) measuring the water content of the soap, (d) adding the optimal amount of acid and water to the soap, (e) mixing the added acid and water with the soap forming acidulated soap whereby crude tall oil is separated, and (f) recovering the separated crude tall oil from the acidulated soap.

It has been surprisingly been found that the CTO recovery from a soap can be optimized by measuring the water content of the soap. It was found that there is a correlation between the water content and the CTO content of a soap. Consequently, by determining this correlation for a specific soap it is possible to measure the water content of the soap and then to know the CTO content of the soap. Furthermore, the amount of acid and water that needs to be added to the soap in order to separate the optimal amount of CTO depends on the amount of CTO presence in the soap. Consequently, by determining the amount of acid and water needed for separating the optimal amount of CTO at different CTO contents for a specific soap, it will be possible to measure the water content of the soap and then to know the amount of acid and water needed in order to separate the optimal amount of CTO from the soap. The added acid and water is mixed with the soap after addition forming an acidulated soap which is separated into the three phases from which the crude tall oil can be recovered. It is preferred to use an adequate mixing both in step (b) and (e) after the water and acid have been added to the soap in order to form a homogeneous acidulated soap.

It is preferred that the water content is measured on-line on a soap flow. It is thus possible to measure the water content on-line on a soap flow and then to directly regulate the added amount of acid and water. The water content and the crude tall oil content in a soap flow tend to vary in a process and it is thus of importance to directly be able to regulate the needed amount of acid and water that is added to the soap in order to improve the recovery of the CTO.

The pH of the spent acid fraction of the acidulated soap after addition of the acid and water to the soap in step (d) is preferably less than 5, more preferably between 2-4,5 and even more preferably between 3-3,5.

The temperature of the acidulated soap in step (e) is preferably between 80 to 102° C., more preferably between 90 to 100° C. and even more preferably between 95 to 99° C. The temperature of the acidulated soap is preferably regulated by addition by appropriate amount of steam in order to receive the optimal temperature.

It is preferred that step (e) is followed by a retention time before the soap is entered to the recovery step (f). The retention time may be needed in order for the different phases of the soap to be clearly separated from each other and thus facilitate the recovery of the CTO.

It is preferred that the acid added in step (d) is a strong acid. It is preferred that the acid is sulfuric acid which is added in an amount of between 120 to 300 kg/t crude tall oil.

It may be preferred to use a hydrodynamic separator, centrifugal separator or decanter type process for the recovery of the separated crude tall oil in step (f).

The water content of said soap is preferably between 25 to 55 wt-%, preferably between 32 to 44 wt-% and even more preferably between 34-38 wt-%.

It may also be preferred that step (a) also comprises the step of measuring the black liquor content of the soap and adjusting the black liquor content to between 3 to 30 v-%. It has been found that it may be preferably to also measure the black liquor content of the soap since the needed amount of acid and water also may depend on the black liquor content of the soap.

Definitions

Definition of a Soap

This definition includes a soap that has been separated from a black liquor of an alkaline pulping process. The definition includes all kind of soaps independent of the raw material used during the pulping process and the separation process of the soap from the black liquor.

Definition of an Acidulated Soap

This definition includes a soap of which the pH of the soap has changed from alkaline to acidic resulting in that the sodium salts of fatty and resin acids present in the soap are converted to acids.

Definition of Water Content

This definition includes the amount of water presence in a soap, i.e. the water that is removed by evaporation. The water content is calculated after measuring the dry content of the soap. The dry content is measured as weigh percentage (wt-%) of the soap and it may be measured according to SCAN-N 22:77. The water content is thereafter calculated by as: 100%–dry content=water content (wt-%).

Definition of Crude Tall Oil Content

This definition includes the amount of crude tall oil, also called only tall oil, in a soap. The crude tall oil (CTO) is measured as weight percentages (wt-%) of the soap and it may be measured according to the method PCTM 7 (Content of tall oil in tall oil soap, Pulp Chemicals Association, 1996) or by PCA-7.

Definition of Acid Concentration

This definition includes the acid concentration, which is measured as wt-% and calculated as follows:

$$\frac{100\% \text{ acid as grams}}{100\% \text{ acid as grams} + \text{added water amount as grams}} * 100\%$$

Definition of Total Acid Concentration

This definition includes the total acid concentration, which is measured as wt-% and calculated as follows:

$$\frac{100\% \text{ acid as grams}}{100\% \text{ acid as grams} + \text{added water amount as grams} + \text{water content in the soap as grams}} * 100\%$$

Definition of " . . . Separate an Optimal Amount of Crude Tall Oil from the Soap . . . "

With this definition it is meant that a major part of the crude tall oil is separated and recovered from the soap. With a major part it is meant that at least 80 to 95 wt-%, more preferably at least 85 to 95 wt-%, even more preferably at least 95 wt-% of the tall oil contained in the soap is separated and recovered.

DETAILED DESCRIPTION OF THE INVENTION

It has surprisingly been found that by measuring the water content of a soap it will be possible to adjust the amount of acid and water that is added to the soap in order for the optimal amount of crude tall oil to be separated and later on recovered from the soap in the soap acidulation process.

During the process of separating crude tall oil from a soap, the quality of the soap may vary depending for example on the raw material used during the pulping process. Furthermore, the water content and the crude tall oil content of the soap may vary due to the process parameters during the black liquor skimming, i.e. the parameters of the process in which the soap is separated from the black liquor. Thus, by measuring the water content of the soap, preferably on-line, it is possible to continuously adjust the amount of acid and water that needs to be added in order to separate the optimal amount, i.e. the major part, of the CTO from the soap.

It is very important that the CTO separation and recovery is done as efficient as possible. The present invention will improve the accuracy of the amount of acid and water that needs to be added to the soap. Too high amount and/or concentration of acid added will increase the risk of corrosion of the equipment and this will thus lead to an increased need for maintenance. Too low amount and/or concentration of acid added will not be able to separate the optimal amount of CTO from the acidulated soap, i.e. it will lead to CTO losses. Consequently, the present invention will lead to an improved CTO production with decreased amount of CTO losses to the reject fractions of the soap. Furthermore, the present invention also gives economically and environmentally benefits due to the improved control of the amount of acid that is added to the soap.

The present invention relates to a method for recovering crude tall oil from a soap wherein the method comprises the steps of: determining a correlation between the crude tall oil content and the water content of the soap, determining an amount of acid and water needed in order to separate an optimal amount of crude tall oil from the soap dependent on the crude tall oil content of the soap, measuring the water content of the soap, adding the optimal amount of acid and water to the soap based on the water content of the soap, mixing the added acid and water with the soap whereby an acidulated soap is formed and crude tall oil is separated and recovering the separated crude tall oil from the acidulated soap.

It was found that the crude tall oil content and the water content of a soap correlates with each other. It was found that for many soaps the correlation is linear. The correlation between the crude tall oil content and the water content needs to be determined for each specific soap. The correlation is unique for each soap and it needs to be determined once for each soap quality. If the quality of the soap changes during the process, the correlation between the crude tall oil content and the water content needs to be determined again. The quality can be changed if the raw material is changed, e.g. the type of wood used, during the pulping process or if other changes are made during the processes. One way to know when the correlation needs to determined again, i.e. if the quality of the soap has changed too much is by measuring the yield of the separated CTO and compare it to the water content. If the amount of CTO separated and the amount of water added no longer correlates according to the determined correlation a new correlation needs to be determined.

In the same way, the amount of acid and water needed for separation of the optimal amount of CTO at different CTO contents needs to be determined. This needs to be done once for each soap quality since the amount of acid and water needed may differ depending on the soap quality. In the same way, when the yield of the separated CTO is below acceptable levels, the optimal amount of added acid and water added needs to be re-determined. The chemistry of a soap is complicated so it is not possible to theoretically calculate the amount of acid and water needed in order to separate the optimal amount of CTO. In the soap, both the sodium salts present in the soap as well as the black liquor of the soap will consume the added acid. Also, the amount of acid and water added to the soap in order to separate the optimal amount of CTO will depend on the CTO content of the soap. If the CTO content of the soap changes, the optimal amount acid and water needed also changes. By determining the amount of acid and water needed for a specific soap dependent on different CTO contents, it is possible to know what amount of acid and water that needs to be added to the soap at a specific CTO content in order to separate the optimal amount of the CTO from the soap.

In order to determine the correlation between the water content and the CTO content of the soap, the water content is changed and the tall oil content of the soap for the different water contents is then determined. It would be preferred to determine the correlation within the typical range of the water content and tall oil content, e.g. with a water content of between 25-55 wt-% and a CTO content of between 40-70 wt-%. In order to determine the correlation it is preferred to use at least 5 and even more preferably at least 10 soap samples with different water content and/or tall oil content in order to determine the correlation. It may be possible to obtain the series of samples by collecting the samples during several days or weeks and thereby achieve samples with different water contents and tall oil contents due to the variation in the process. It may also be possible to change the water content of the soap by adding black liquor and thereby obtain samples with different water contents.

In order to determine the amount of acid and water needed to separate an optimal amount of CTO from the soap in which the CTO content varies, different amounts of acid and water is added to soaps with various CTO contents needs to be tested. If sulphuric acid is used, suitable acid concentration is between 10 to 50 wt-%, preferably between 16 to 42 wt-%. It is important to minimize the evaporation of water during the separation in order to keep the acid concentration constant, i.e. if water is evaporated due to high temperature, the acid concentration will change. The pH of the spent acid fraction of the acidulated soap after the addition of the acid and water is preferably below 5, preferably between 3-3,5. The temperature of the acidulated soap during the determination of the acid and water is preferably between 80 to 102° C. It is preferred that the conditions, e.g. temperature and pH, and the acid used in step (b), i.e. during the determination of optimal amount of acid and water needed, are the same as in steps (d) and (e).

The separated CTO is thereafter recovered and the optimal amount of acid and water needed for the specific CTO content is seen since this amount provides the highest amount of recovered CTO. These tests will then be repeated for soaps with different CTO contents.

It is possible to add the acid and water as a mixture to the soap, i.e. in one step or stream as a diluted acid. It is also possible to add the acid and water in two separate steps or streams to the soap. It may also be possible to add a diluted acid, i.e. a mixture of acid and water, to the soap in one step or stream and to add water in a second step or stream. It may also be possible to first add water followed by addition of the acid. After the acid and water is added to the soap the acid, water and soap is mixed in order to make sure that a homogenous mixture, i.e. a well-mixed acidulated soap is formed. The time for the mixture depends on the amount of soap, acid and water added and also the mixing equipment used. All kinds of suitable mixing equipments may be used.

The acid is added to the soap in order for the sodium salts present in the soap to form acids which will have a different density compared to the other two phases of the soap, i.e. the lignin phase and the spent acid phase. The addition of acid to the soap will form an acidulated soap. The difference in density will enable the separation in three phases from each other. The water is added to the soap in order to achieve the best density difference and thus achieve the optimal separation of the CTO from the soap.

When the correlation between the CTO and the water content of the soap is determined and the amount of acid and water that needs to be added for different CTO contents is determined, it is possible to measure the water content of the soap and then to know the amount of acid and water that needs to be added to the soap in order to separate the optimal amount, i.e. the major part, of the CTO from the soap.

The amount of acid and water may be added continuously to the soap flow.

It is preferred that the water content is measured on-line on a soap flow. The water content is preferably measured by the use of Near Infrared (NIR) spectroscopy, a refractometer, conductivity measurements or by any other known method. By doing the measurement of the water content on-line it is possible to adjust the amount of acid and water added to the soap continuously based on the current water content of the soap. In this way it is possible to get a very accurate and improved method for separating and recovering CTO from a soap.

It is preferred that the acid added in step (d) is a strong acid. It is preferred that the acid is sulfuric acid which is added in an amount of between 120 to 300 kg/t CTO, more preferably between 150-260 kg/t CTO and even more preferably between 160-220 kg/t CTO. These values are given as 100% sulphuric acid per ton of CTO contained in the soap. The amount of acid needed in order to separate the optimal amount of CTO depends on which acid that is used and must thus be measured separately for that specific acid. Besides sulphuric acid, other acids such as waste acid produced as a side stream of a $ClO_2$ production (process types Mathieson, Solvay, R2, HP-A), phosphoric acid, carbon dioxide (as a pre-acidulation acid), organic acids or any mixture thereof can be used.

The pH of the spent acid fraction of the acidulated soap in step (e), i.e. is preferably less than 5, more preferably between 2-4,5 and even more preferably between 3-3,5.

The temperature of the acidulated soap in step (e) is preferably between 80 to 102° C., more preferably between 90 to 100° C. and even more preferably between 95 to 99° C. The temperature of the acidulated soap is preferably regulated by addition of the appropriate amount of steam in order to receive the optimal temperature of the soap. The optimal temperature is the temperature at which the optimal amount of CTO is separated from the acidulated soap. Thus, the temperature during the retention is also between 80 to 102° C., more preferably between 90 to 100° C. and even more preferably between 95 to 99° C.

Once the acid and water has been added and mixed with the soap an acidulated soap is formed and it is poured into the vessel in which the separation and recovery of the crude tall oil occurs. In the vessel the crude tall oil, the lignin and the spent acid phases begin to separate from each other as a function of time. Once the acidulated soap is added to the vessel, it may be necessary to wait for a period of time, i.e. for a retention time in which the separation of the three phases of the acidulated soap occurs. The retention time is preferably between 1 second to 24 hours, more preferably between 1 second to 6 hours, more preferably between 1 second to 2 hours. The time needed in order for the CTO phase to separate from the other phases depends on the separation method used, the process conditions during the step in which acid is added and on the soap quality e.g. the black liquor content of the soap. The separation and the recovery of the CTO from the acidulated soap may be done in a hydrodynamic separator or decanter type process, however any known method can be used in order to separate the CTO. If the separation occurs in a hydrodynamic separator, the separation can be enhanced by addition of an internal spent acid flow in order to keep the lignin phase in movement in order to promote CTO separation. The CTO phase is located on the top of the separator and overflows, and is thus removed and recovered, from the upper part of the separator. The reject fraction, lignin and spent acid phases are removed from the separator from the middle respectively bottom part of the separator.

It may also be possible to measure the black liquor content of the soap. If the water content is high and/or the black liquor content is high, it may be advantageous to concentrate the sample and reduce the black liquor content by any known method, e.g. by the use of a centrifugal method. This is due to the too high amounts of black liquor in the soap is not desirable since the black liquor will consume the added acid. Preferably, the black liquor content of the soap is between 3 to 30 volume %, even more preferably between 5 to 25 volume %. It may be possible to measure the black liquor content or other components of the soap, such as fatty acid resins, fibre composition etc. by Near Infrared (NIR) spectroscopy, by RAMAN spectroscopy or any other known method.

Suitable equipment for CTO recovery measurement should be similar to the equipment used in recovery processes used today, such as a decanter. The CTO recovery is given as percentage of the present CTO content of the soap. It can be also be measured volumetrically and can be calculated as CTO recovered (kg)/(soap amount fed to the system (kg)×CTO content in the soap (wt-%)).

It may also be possible to use different additives in order to improve the separation of the CTO from the acidulated soap. These additives may be added before, together and/or after the addition of the acid and water to the soap.

EXAMPLES

Figure 3:
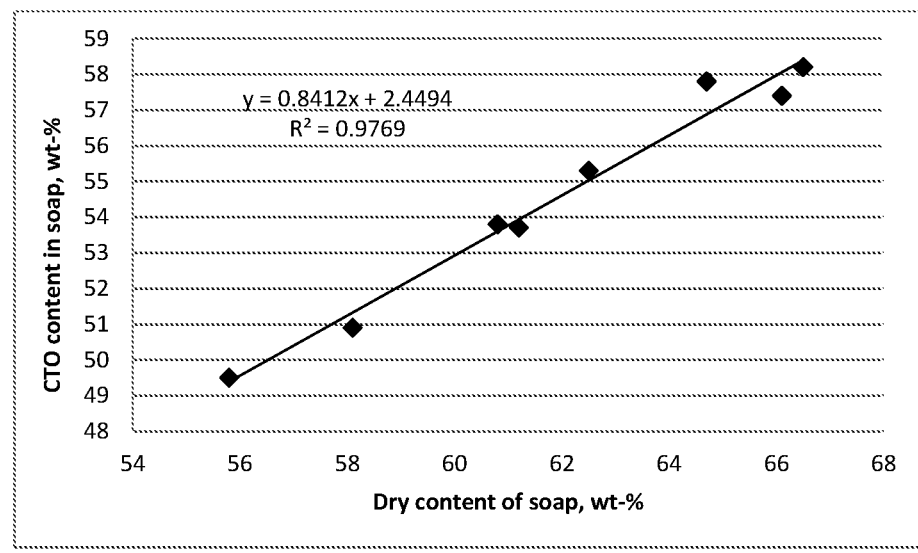
FIG. 3. Shows the correlation between the dry content and the CTO content of the soap at 25° C.
Figure 4:
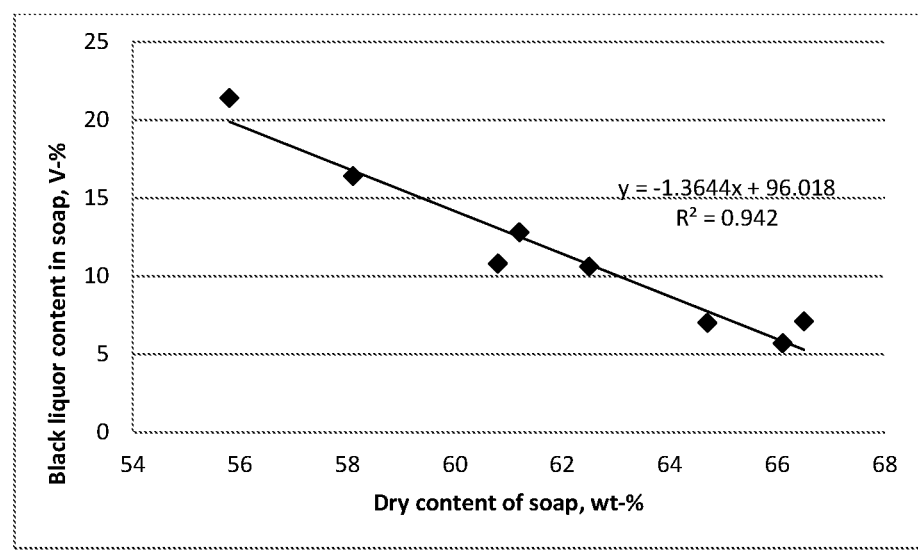
FIG. 4. Shows the correlation between the dry content and the black liquor content of the soap at 25° C.
Figure 5:
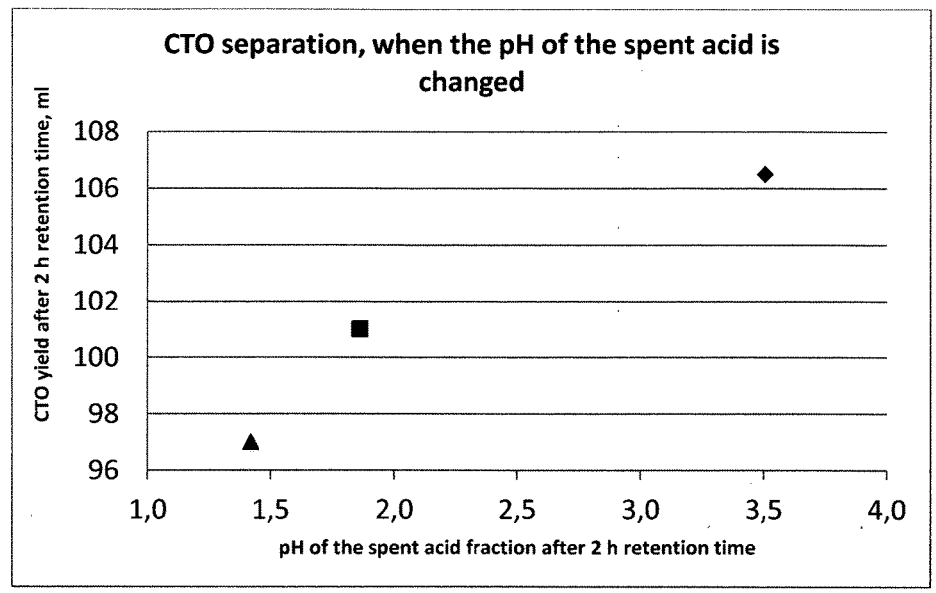
FIG. 5. Shows the amount of separated CTO when the end pH of the spent acid is changed by charging different acid amounts to the soap.
Figure 6:
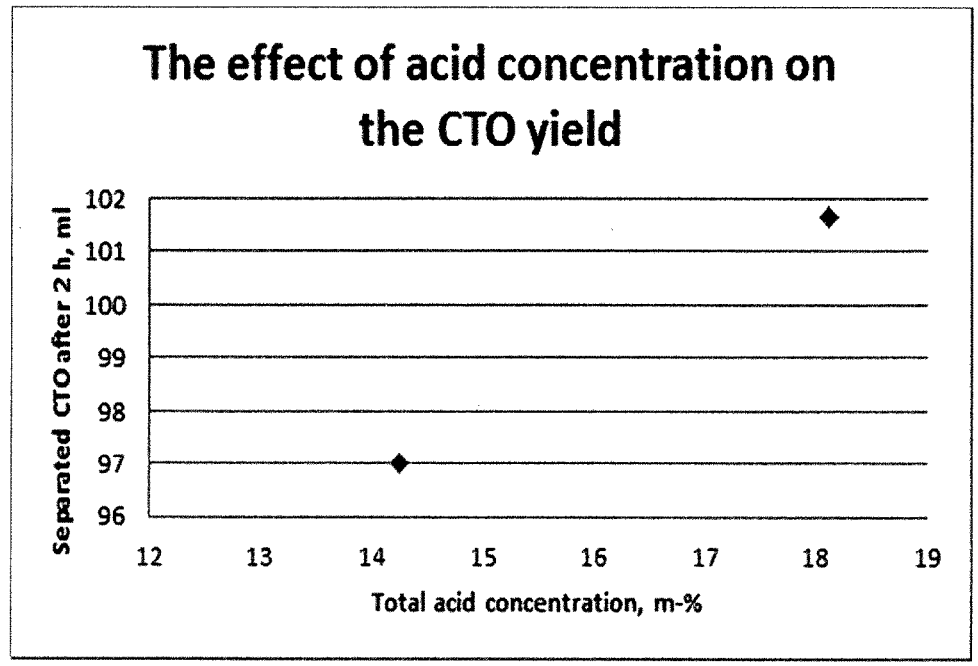
FIG. 6. Shows the amount of separated CTO at different total acid concentrations when the end pH of the spent acid is constant.
Figure 7:
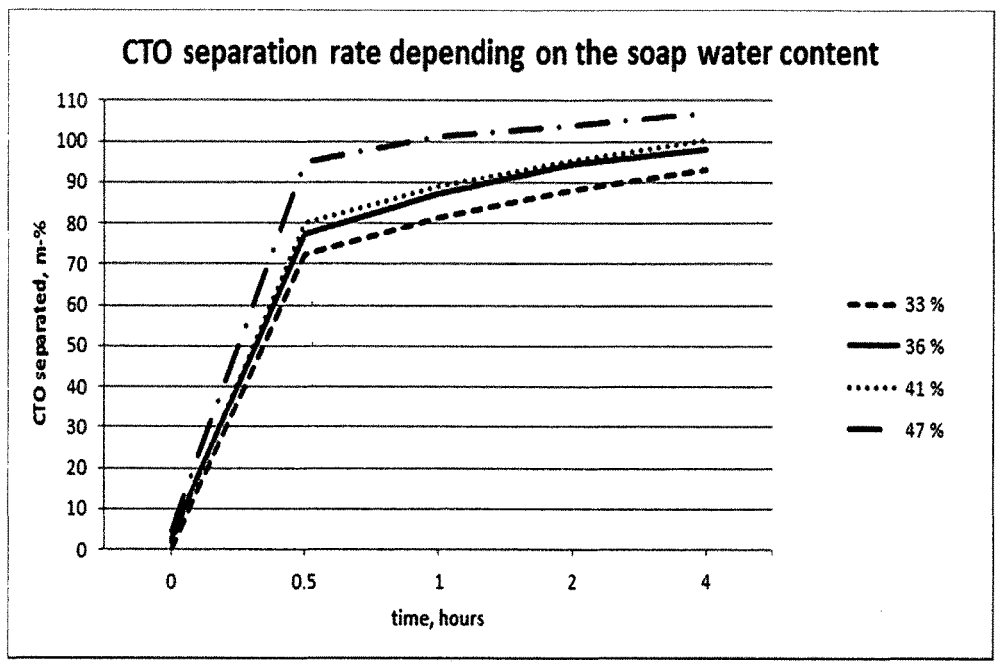
FIG. 7. Shows the CTO separation rate depending on the water content of the soap.

The soap samples used in the experimental part as shown in FIGS. 1, 2, 3 and 4 were collected between June and July 2011 and the soap sample showed in FIGS. 5 and 6 was collected in June 2013 and the soap sample showed in FIG. 7 was collected in November 2013. All samples were collected from a soap acidulation process at a kraft pulp mill directly before the soap acidulation.

The origin of the soap used in FIGS. 1, 2, 3 and 4 was from a kraft pulping process using approximately 60% birch and 40% softwood (mainly pine). Fatty acid content was 44 m-%, resin acid content was 24 m-% (GC composition). The origin of the soap used in FIGS. 5, 6 and 7 was also from a kraft pulping process using approximately 60% birch and 40% softwood (mainly pine).

The dry content of the soap was measured using the method SCAN-N 22:77 and the water content was calculated as described in the definition above for all the samples of FIGS. 1, 2, 3, 4, 5, 6 and 7. The black liquor content in the soap was measured by centrifugation (based on method of an accredited laboratory).

The CTO content in soap of FIGS. 3, 4, 5 and 6 has been measured by method PCTM7 (Pulp Chemicals Association, 1996). The CTO content of the soap samples for FIG. 7 was analyzed using PCA-7.

Example 1. Prior Art Process—Density Measurements

Figure 1:
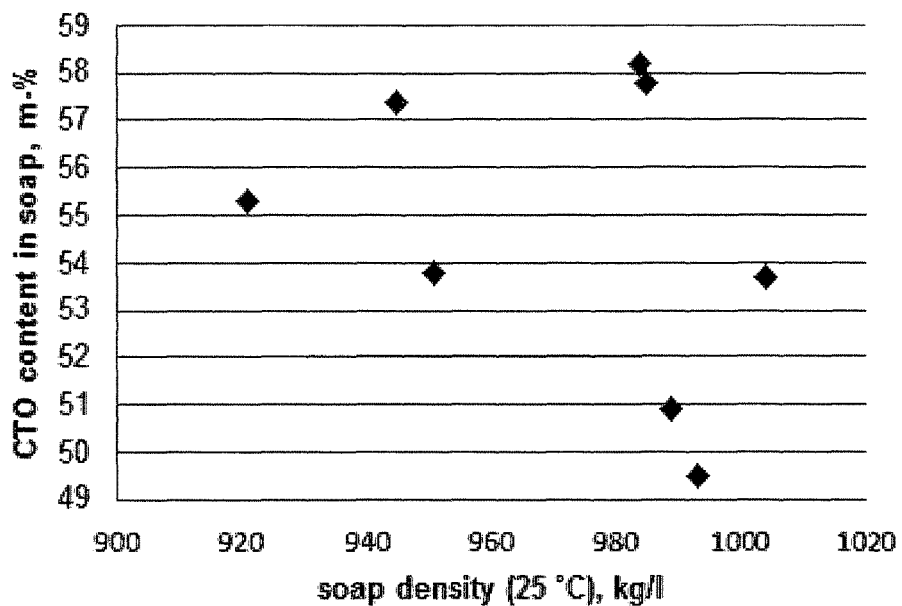
FIG. 1. Shows the correlation between the soap density and the CTO content of the soap at 25° C.

Based on laboratory analysis, the black liquor content in soap does not correlate linear with the measured soap density as illustrated in FIG. 1.

Figure 2:
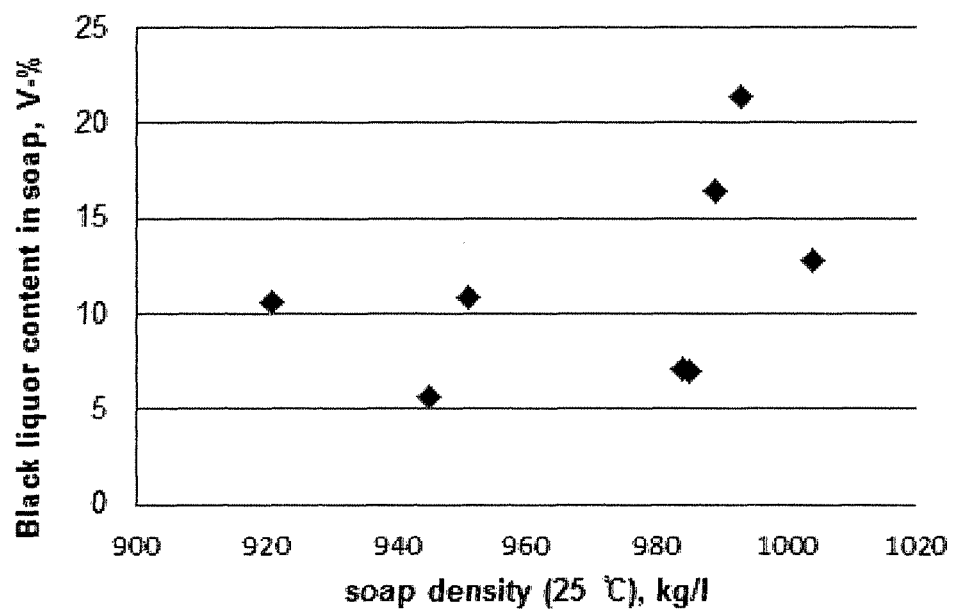
FIG. 2. Shows the correlation between the soap density and the black liquor content of the soap at 25° C.

Furthermore, the soap density does also not correlate linearly with the CTO content in soap as shown in FIG. 2.

The results shown in FIGS. 1 and 2 demonstrate that the changes in soap quality cannot be controlled only based on density measurements. If density is used as the only control parameter for the addition of acid and water, the CTO losses increases due to the inaccuracy of the control. Consequently, the required acid and water amount for optimal CTO separation and recovery cannot be adequately adjusted only based on density measurements.

Example 2. Correlation Between the Dry Content and the CTO Content and Between the Dry Content and the Black Liquor Content FIG. 3 shows the correlation between the dry content of the soap and the CTO content of the soap at 25° C.

FIG. 4 shows the correlation between the dry content of soap and the black liquor content in soap at 25° C.

Both correlation lines, as shown in FIG. 3 and FIG. 4, are soap and/or mill specific and depend on the soap composition of the specific soap.

The soap dry content correlates linearly with the CTO content in the soap as well as with the black liquor content of soap as can be seen in FIGS. 3 and 4. Consequently, once the correlation line is determined it is possible to measure the water content of the soap and then to know the CTO content and the black liquor content of the soap.

Example 3. Separation of Crude Tall Oil from the Soap

The amount of crude tall oil that is separated and recovered from the soap depends on the amount of acid added during the acidulation step. This can be seen in FIG. 5.

From FIG. 5 it can clearly be seen that the amount of acid added to the soap separates different amounts of CTO from the soap. The acidulation of the soap was performed with different acid charges in order to obtain different pH of the spent acids after the retention time. The retention time for these tests were 2 hours.

The amount of crude tall oil that is separated and recovered from the soap depends on the acid concentration, i.e. the amount of water added during the acidulation step. This can be seen from FIG. 6.

From FIG. 6 it can clearly be seen that the amount of water mixed to the soap separates different amounts of CTO from the soap when the pH of the spent acid after the retention time is kept constant. The retention time for these tests were 2 hours.

Example 4. Separation of Crude Tall Oil Dependent on the Water Content

4×10 l soap samples were collected from the same soap. Each soap sample was mixed with black liquor in order to obtain different water contents of the soaps. The different water contents of the samples were; 33% by weight, 36% by weight, 41% by weight and 47% by weight.

To each soap sample 40 wt-% sulphuric acid was added and mixed with the soap in order to form acidulated soap. The end pH of the spent acid fraction was 3 and the temperature during the acidulation was 98° C. The acidulated soap was thereafter poured into a measurement glass and the CTO separation was measured volumetrically as a function of time. The temperature of the soap during the retention time was 95° C.

The result can be seen in FIG. 7 and it is evident that the amount of acid added to the soap in order to achieve good separation of CTO at a reasonable time clearly depends on the water content of the soap.

Example 5. Illustration of Changed Water Content of a Soap

Figure 8:
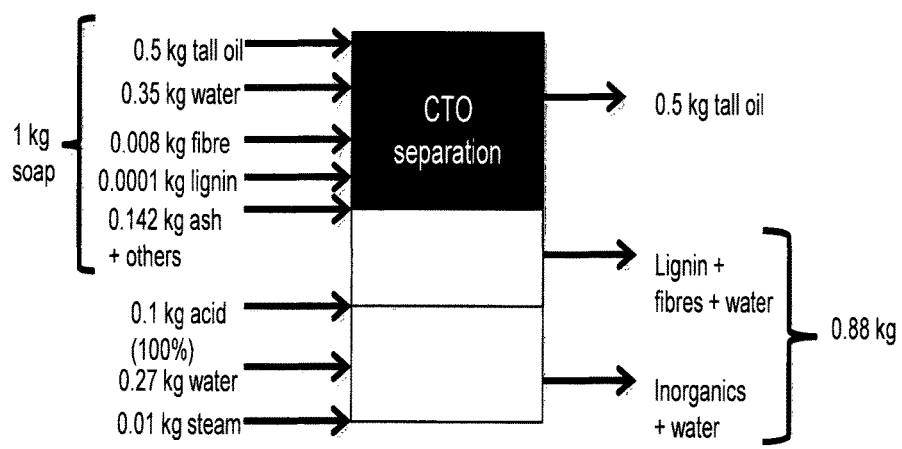
FIG. 8. Shows the CTO recovery when the optimal amount of acid has been added.
Figure 9:
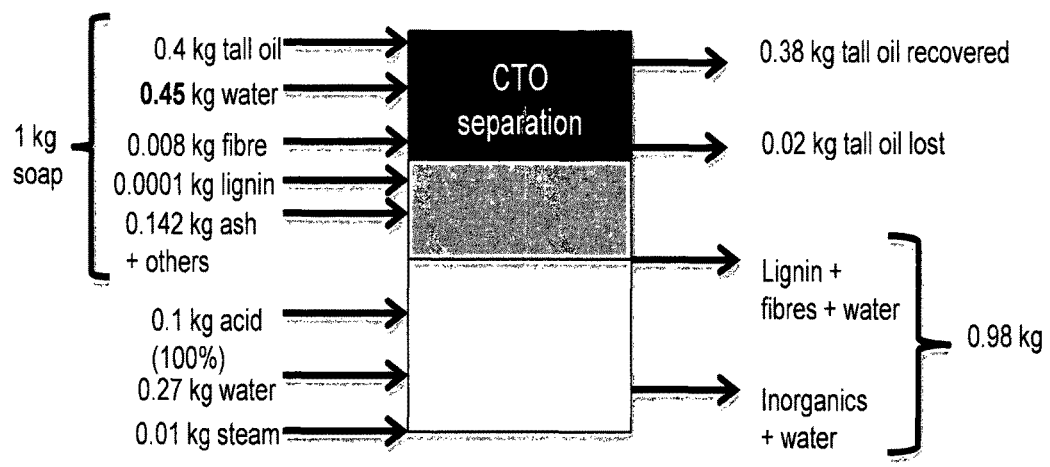
FIG. 9. Shows the CTO recovery when a non-optimal amount of acid and water has been added.

FIGS. 8 and 9 show an illustrative example of what happens when the water content of a soap changes but the amount of acid and water added to the soap is unchanged.

To 1 kg of soap the same amount of acid and water is added. The water content of the soap shown in FIG. 8 is 35 wt-% and the water content of the soap shown in FIG. 9 is 45 wt-%. In FIG. 8 the optimal amount of the CTO of the soap is separated and recovered, i.e. the amount of acid and water added to the soap with a water content of 35 wt-% is thus optimal. However, in FIG. 9, not all of the present CTO is separated and recovered. Consequently, it is very important to monitor the water content of the soap in order to be able to separate all CTO present in the soap.

It should be understood that the embodiments given in the description and in the examples above are for illustrative purposes only, and that various changes and modifications are possible within the scope of the invention.

The invention claimed is:

1. A method for recovering crude tall oil from a soap comprising the steps of:
    (a) determining a correlation between the crude tall oil content and a water content of the soap by measuring the crude tall oil content of samples of the soap containing different water content,
    (b) determining an amount of acid and water needed in order to separate an optimal amount of crude tall oil from the soap dependent on the crude tall oil content of the soap by adding different amounts of acid and water to samples of soaps having different crude tall oil content and identifying the amount of acid and water providing the highest amount of recovered crude tall oil for a given crude tall oil content,
    (c) measuring a water content of the soap,
    (d) determining the crude tall oil content of the soap from the water content measured in step (c) and the correlation determined in step (a),
    (e) determining an optimal amount of acid and water for the crude oil content determined in step (d) based on the amount of acid and water identified in step (b) as providing the highest amount of recovered crude tall oil,
    (f) adding the optimal amount of acid and water to the soap,
    (g) mixing the added optimal amount of acid and water with the soap whereby acidulated soap is formed and crude tall oil is separated from a lignin phase and a spent acid phase, and
    (h) recovering the separated crude tall oil from the acidulated soap.
2. The method according to claim 1 wherein the water content is measured on-line on a soap flow.
3. The method according to claim 1, wherein a pH of the spent acid D fraction of the acidulated soap after addition of the acid and water in step (g) is less than 5.
4. The method according to claim 1, wherein a temperature of the D acidulated soap in step (g) is between 80 to 102° C.
5. The method according to claim 1, wherein step (g) is followed by D a retention time before entering the recovery step (h).
6. The method according to claim 1, wherein the acid added in step (f) is a strong acid.
7. The method according to claim 6, wherein the acid added in step (f) is sulfuric acid which is added in an amount of between 120 to 300 kg/t crude tall oil.
8. The method according claim 1, wherein a hydrodynamic separator, centrifugal separator or decanter type processes are used for the recovery of the separated crude tall oil in step (h).
9. The method according to claim 1, wherein the water content of said soap measured in step (b) is between 25 to 55 wt-%.
10. The method according to claim 1, wherein step (a) also comprises the step of measuring a black liquor content of the soap and adjusting the black liquor content to 3 to 30 volume %.
11. The method according to claim 1, wherein the water content of said soap measured in step (c) is between 32 to 44 wt-%.

* * * * *

UNITED STATES PATENT AND TRADEMARK OFFICE
CERTIFICATE OF CORRECTION

PATENT NO.         : 10,047,320 B2
APPLICATION NO.    : 15/315906
DATED              : August 14, 2018
INVENTOR(S)        : Tiia Finer and Olli Timonen It is certified that error appears in the above-identified patent and that said Letters Patent is hereby corrected as shown below:

In the Claims

Column 10:
Claim 3, Line 37, delete "D"
Claim 4, Line 40, delete "D"
Claim 5, Line 43, delete "D"

Signed and Sealed this
Sixteenth Day of April, 2019

Andrei Iancu
*Director of the United States Patent and Trademark Office*